(12) United States Patent
Ayars et al.

(10) Patent No.: US 8,341,431 B2
(45) Date of Patent: Dec. 25, 2012

(54) SCALABLE AND EXTENSIBLE SECURE RENDERING OF DIGITAL CONTENT

(75) Inventors: Jeffrey M. Ayars, North Bend, WA (US); Rahul Agarwal, Issaquah, WA (US); Alain Hamel, North Bend, WA (US); Darren P. Schack, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 354 days.

(21) Appl. No.: 12/625,383

(22) Filed: Nov. 24, 2009

(65) Prior Publication Data

US 2010/0131776 A1  May 27, 2010

Related U.S. Application Data

(63) Continuation of application No. 10/075,471, filed on Feb. 13, 2002, now Pat. No. 7,636,860.

(51) Int. Cl.
*G06F 21/00* (2006.01)
(52) U.S. Cl. ............... 713/194; 713/189; 726/2; 726/27
(58) Field of Classification Search ............... 713/194
See application file for complete search history.

(56) References Cited

U.S. PATENT DOCUMENTS

| | | | | |
|---|---|---|---|---|
| 5,991,399 | A | * | 11/1999 | Graunke et al. ............. 380/279 |
| 6,044,469 | A | * | 3/2000 | Horstmann ................... 726/29 |
| 6,775,779 | B1 | * | 8/2004 | England et al. ................ 726/26 |

OTHER PUBLICATIONS

"Notice of Allowance", Aug. 14, 2009. Ayars, Jeffrey M., "Scalable and Extensible Secure Rendering of Digital Content" Patent 7,636,860.

* cited by examiner

*Primary Examiner* — Edward Zee
*Assistant Examiner* — Yogesh Paliwal
(74) *Attorney, Agent, or Firm* — Æ ON Law; Adam L.K. Philipp

(57) ABSTRACT

A number of digital content rendering modules are equipped such that selective subsets of the modules may be employed to render digital content of different media, and of different format types. The modules are organized into a hierarchy, with a selected one occupying a root position of the hierarchy, to exclusively receive the digital contents to be rendered, and that each module is further responsible for verifying the integrity of its immediate downstream modules, to collectively protect the digital contents being rendered. Additionally, in accordance with another aspect, a tamper resistant module is employed to recover digital contents provided in a protected state, obfuscating the recovery. Further, the modules may be of different application domains.

9 Claims, 10 Drawing Sheets

SCALABLE AND EXTENSIBLE SECURE RENDERING OF DIGITAL CONTENT

CROSS REFERENCE TO RELATED APPLICATIONS

This application is a continuation of prior application Ser. No. 10/075,471, filed Feb. 13, 2002, titled "SCALABLE AND EXTENSIBLE SECURE RENDERING OF DIGITAL CONTENT," having, and naming the following inventors: Jeffrey M. Ayars, Rahul Agarwal, Alain Hamel, and Darren P. Schack. The above-cited application is incorporated herein by reference in its entirety, for all purposes.

FIELD

The present invention relates to the field of data processing. More specifically, the present invention relates to the secure rendering of digital content.

BACKGROUND

With advances in integrated circuit and microprocessor, processor based computing devices are increasingly more powerful in terms of their processing capabilities. Processing power that was once available only in the most expensive mainframe systems are now available in even many entry level hand held consumer devices. As a result, increasingly, processing intensive rich contents of a wide variety of media types, including but are not limited to audio, video, graphic, and/or textual contents, are being made available and consumed on even the most basic ones of these processor based computing devices.

Concurrently, advances in networking and communication technologies have resulted in increasing number of these processor based computing devices being networked together. Such devices are often first coupled with a local area network, such as an Ethernet-based office/home network. In turn, the local area networks are interconnected together through wide area networks. Of particular importance is the global inter-network, the Internet. As a result of this trend of increased connectivity, an increasing amount of these rich multi-media contents are made available or distributed online.

One factor that continues to hinder the adoption of the digital format for rich multi-media contents (as opposed to the conventional analog format), and online distribution, is the relative ease of misappropriating these multi-media contents embodied in digital format (hereinafter, simply "digital content"). One characteristic that makes the misappropriation of digital contents particularly problematic is the fact that, unlike their analog brethrens, each successively misappropriated digital content remains as good in quality as the original.

A number of ciphering and deciphering techniques, including tamper resistant techniques, to protect the making and distribution of digital contents have been developed and known in the art. The term "tamper resistant" as used in this application refers to a broad range of techniques and/or measures employed to thwart and/or make difficult unauthorized meddling, interfering or other acts of like kind. However, notwithstanding the general increasing availability of processing power, many of these prior art techniques are found be insignificantly burdensome, especially if multiple media types of multiple content formats are to be supported in a secure manner, such as in the entry level computing environment.

Thus, a less burdensome, but sufficiently robust and flexible approach to securely render digital contents of multiple media types, and of multiple formats is desired. The term "rendering" refers to the physical manifesting of contents for use and/or enjoyment by a user/consumer, including but are not limited to visually and/or audibly manifesting the contents.

BRIEF DESCRIPTION OF THE DRAWINGS

The present invention will be described by way of exemplary embodiments, but not limitations, illustrated in the accompanying drawings in which like references denote similar elements, and in which.

DESCRIPTION

The present invention includes organization and cooperation between a collection of digital content rendering modules to collectively protect the digital contents being rendered. In the description to follow, various aspects of the present invention will be described, and specific configurations will be set forth. However, the present invention may be practiced with only some or all aspects, and/or without some of these specific details. In other instances, well-known features are omitted or simplified in order not to obscure the present invention.

The description will be presented in terms of operations performed by a processor based device, using terms such as digital contents, module hierarchy, requesting, verifying, transferring, and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical, electrical and/or optical components of the processor based device.

Moreover, the term "processor" includes microprocessors, micro-controllers, digital signal processors, and the like, that are standalone, adjunct or embedded. Further, the term "processor based computing devices" (hereinafter, simply computing device) includes but are not limited to wireless mobile phones, palm sized personal digital assistants, notebook computers, desktop computers, set-top boxes, game consoles, servers, and so forth.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The description repeatedly uses the phrase "in one embodiment", which ordinarily does not refer to the same embodiment, although it may. The terms "comprising", "including", "having", and the like, as used in the present application, are synonymous.

Overview

Figure 1:
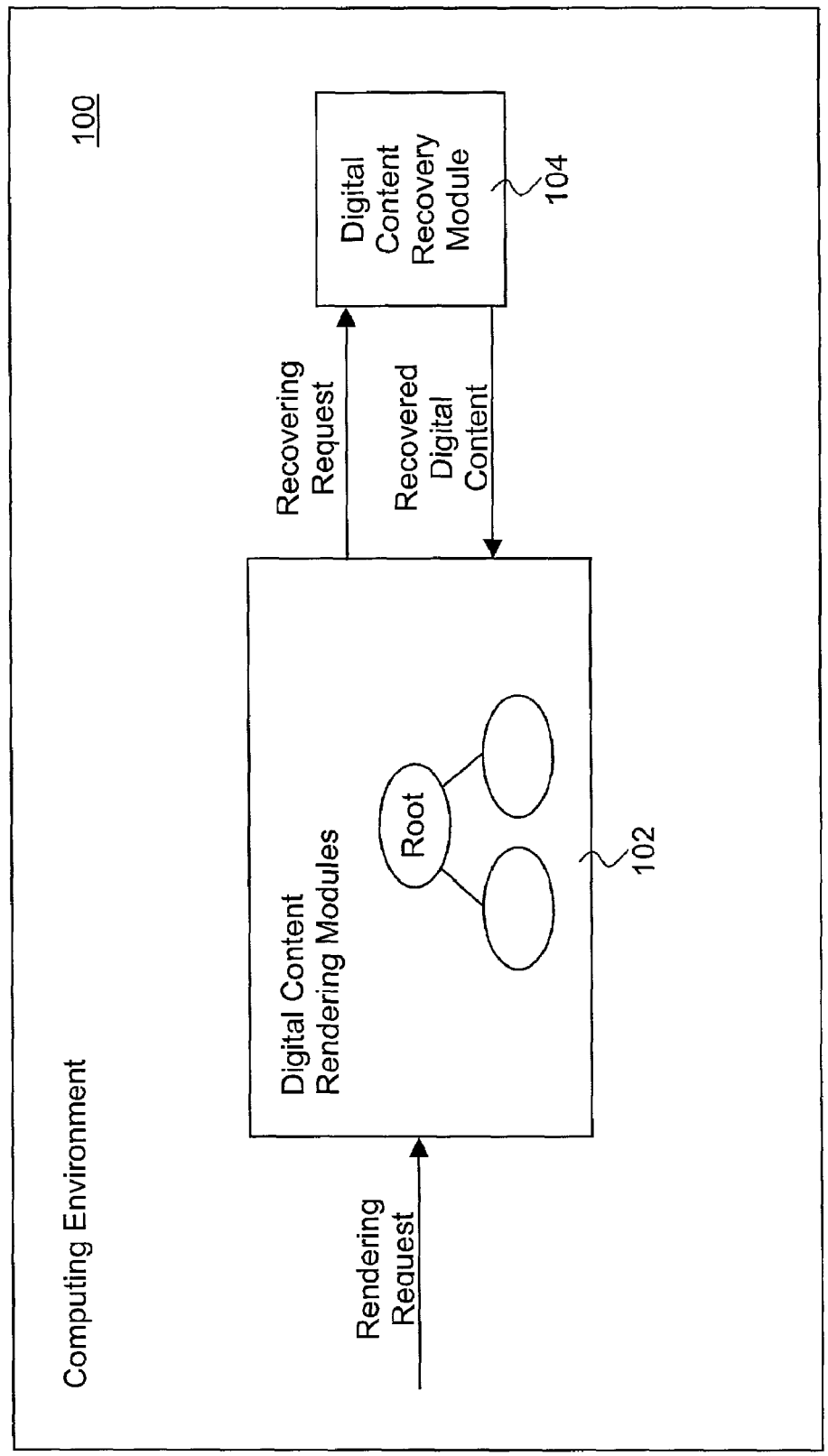
FIG. 1 illustrates an overview of the present invention, in accordance with one embodiment.

Referring now to FIG. 1, wherein a block diagram illustrating an overview of the present invention, in accordance with one embodiment, is shown. As illustrated, for the embodiment, a number of digital content rendering modules 102 are equipped such that selective subsets of modules 102 may be employed to cooperatively render digital contents of different media, and of different format types. Modules 102 may be advantageously organized into a hierarchy, with a selected one occupying a root position of the hierarchy, to exclusively receive the digital contents to be rendered, and that each "non-leaf" module 102 of the hierarchy may be further responsible for verifying the integrity of its immediate downstream modules, to collectively protect the digital contents being rendered. In particular, each "non-leaf" module 102 of the hierarchy may verify to its own satisfaction that the integrity of an immediate downstream module has not been compromised (i.e. having been tampered, modified or otherwise interfered with), before transferring the digital content to the downstream module. Additionally, in accordance with another aspect of the present invention, a tamper resistant module 104 (also referred to as the recovery module) may be employed to recover digital contents provided in a protected state, obfuscating the recovery. The term "protected state" refers to the fact that one or more techniques and/or measures, such as ciphering, have been provided and/or applied to the digital content to guard against or make difficult the misappropriation or misusing the contents.

As a result, modules 102 may be provided and operated in plaintext (i.e. in an unprotected state). Moreover, numerous modules 102 equipped for use in selected combinations in support of numerous media types, of numerous formats, may be provided, enriching the multi-media capability of computing environment 100, but without over burdening nor potentially exposing the environment to abuse, and content misappropriation.

The term "recovery", as used in this application, refers to the process of transforming content from a protected state to an unprotected state (also referred to as the "plaintext" state). The phrase "obfuscating the recovery", as used in this application, refers to the employment of techniques and/or measures to disguise, obscure or otherwise make difficult for a third party to observe, discern or learn the operations performed to recover the protected contents.

Further, the terms "hierarchy" or "hierarchical", as used in this application, refer to the multi-layer or multi-generation characteristic of the logical relationship between the modules. For ease of understanding the present invention, the module occupying the top most layer of the hierarchy is referred to as the "root" module, whereas the other modules are referred to as the "non-root" module.

Computing environment 102 represents a broad range of execution environments known in the art, including but are not limited to computing environments of the earlier mentioned computing devices, i.e. wireless mobile phones, palm sized personal digital assistants, notebook computers, desktop computers, set-top boxes, game consoles, and servers.

Example Hierarchy

Figure 2:
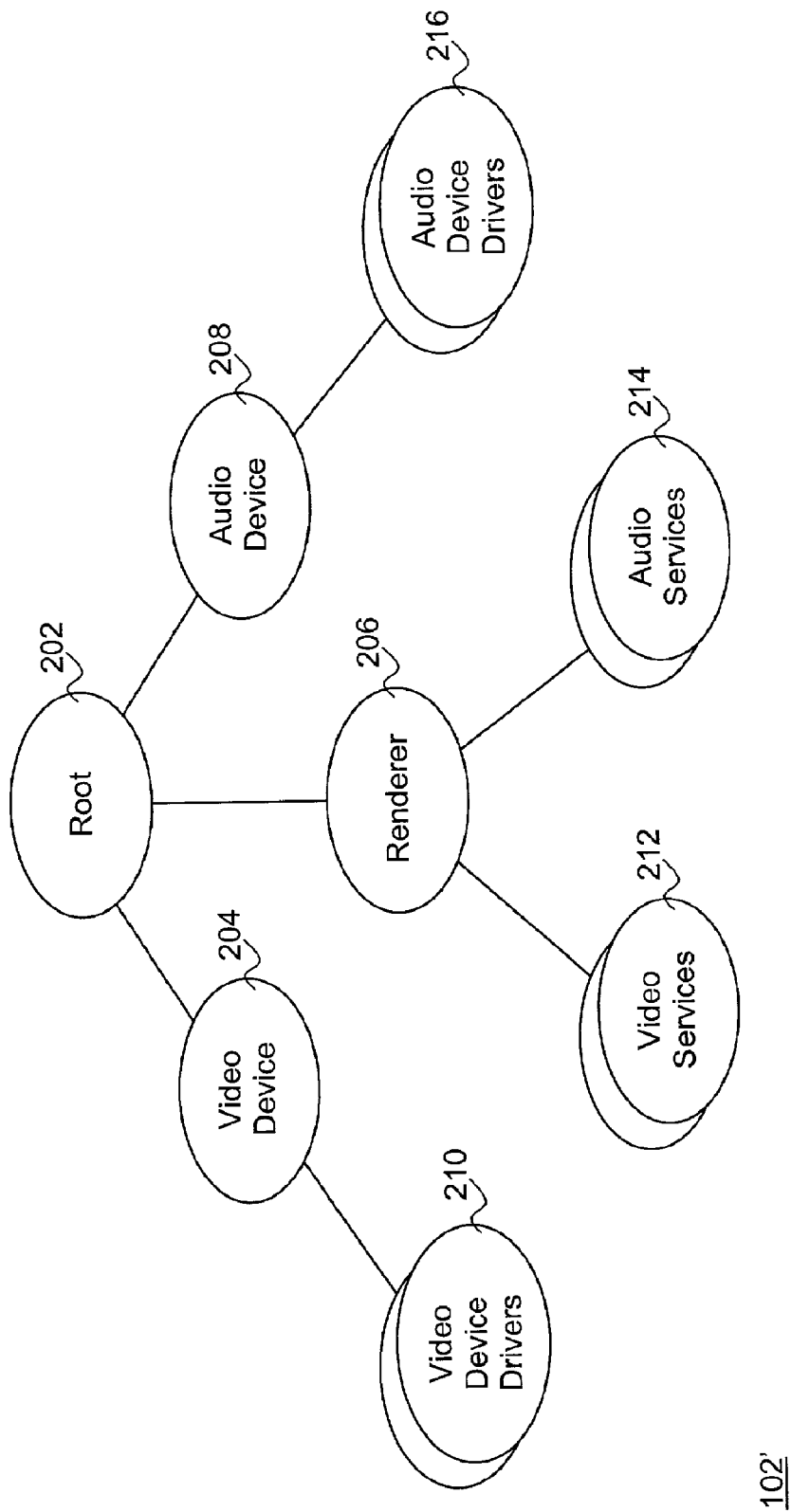
FIG. 2 illustrates an example collection of digital content rendering modules organized into an hierarchy.

FIG. 2 illustrates an example collection of plaintext digital content rendering modules 102' organized into a hierarchy having the earlier described digital content rendering security attributes. The example collection of modules 102' comprises a plaintext base control module 202, a number of plaintext video device related modules 204 and 210, a number of plaintext audio device related modules 208 and 216, and a number of plaintext rendering, audio and video services related modules 206 and 212-214. Plaintext modules 202-216 as described earlier are organized into an hierarchy, with one of the plaintext modules, module 202 for the example collection, occupying a root position of the hierarchy, to exclusively receive all digital contents to be rendered, regardless of media types or formats, i.e. regardless of which combinations of the modules are to be employed to render the digital contents. Further, beside their primary functions, i.e. for interacting with particular video or audio devices, or providing particular video or audio services related to particular media types or formats, all the non-leaf plaintext modules, i.e. modules 202-208, are equipped to verify the integrity of the immediate downstream plaintext modules. That is, the immediate downstream plaintext modules have not been compromised.

Audio and video services may include any number of such services for various audio and video formats known in the art. These audio and video formats may include e.g. MP3, Wave, AVI (Audio Video Interleave), WMA, Real Audio, Real Video, QUICKTIME® and so forth. Rendering may include various audio and/or video synchronization performed for streaming media. The synchronizations may be specified using languages such as the Synchronization Markup Integration Language (SMIL). The various media types may be any media known in the art, including but not limited to film, broadcasting, music, and so forth.

For the purpose of this application, downstream refers to the operational direction, where processing progresses from a root module of the hierarchy, such as module 202, towards a "leaf" module, such as modules 210-216. Employment of the label "downstream" in and itself has no significance. It is merely to assist in the understanding of the present invention.

Method

Figure 3:
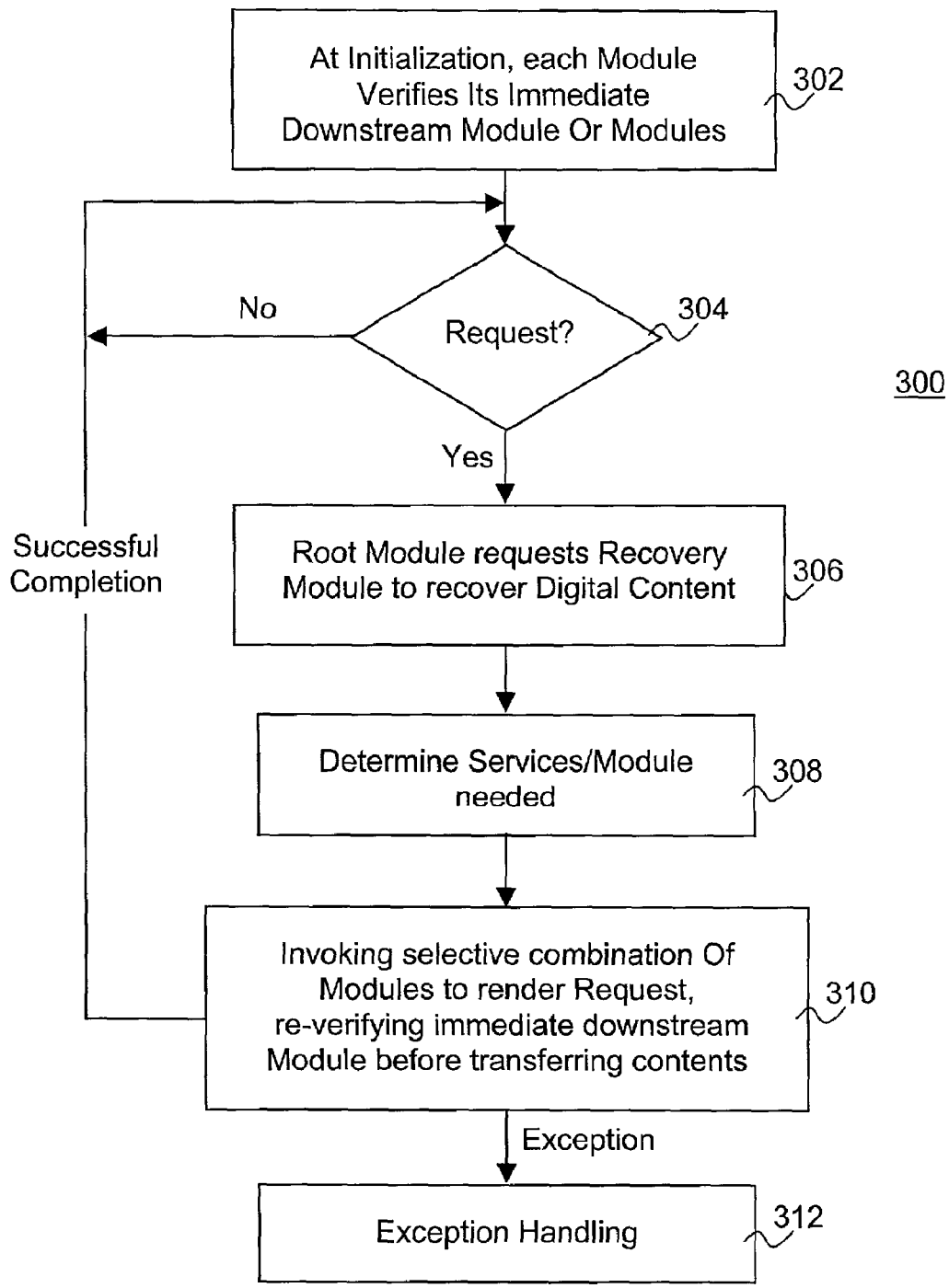
FIG. 3 illustrates the method of the present invention, in accordance with one embodiment.

FIG. 3 illustrates an overview of the method of the present invention, in accordance with one embodiment. As illustrated, for the embodiment, at initialization, each module 102 verifies its immediate downstream module or modules, if applicable, block 302. Initialization refers to a start up period, which may occur under a variety of conditions, including but are not limited to the power on or reset period of the host environment. In one embodiment, each module 102 may verify its immediate downstream module or modules by verifying the downstream modules' signatures. Verification of the downstream modules' signatures may be performed in accordance with any one of a number of techniques known in the art. The term "signature" refers to a derived value, derived base on the content, employing one of a number of known derivation techniques and/or functions, such as hashing.

Thereafter, the modules 102 may await rendering request for a protected digital content, e.g. from an application, block 304. The request may be made via any one of a number of inter-program or inter-process communication protocols. The requesting application or process may be executing in the same computing environment or in a remote separate computing environment. Upon so requested, for the embodiment, root module 102 may request recovery module 104 to recover the protected digital content, which as described earlier, may be advantageously performed in an obfuscated manner, block 306, thereby continuing the protection accorded to the digital content. Similarly, the inter-module request may be made via any one of a number of known inter-program/process communication protocols.

Upon receipt of the recovered digital contents, root module may determine the media and content format types involved, in particular the various device and/or support services required to render the digital contents, block 308. From there, the required subset of modules 102 may cooperate to render the recovered digital content.

For the embodiment, each employed module 102 may re-verify each downstream module 102 to ensure its integrity remains un-compromised, before transferring the recovered digital contents to the immediate downstream module, thereby continuing to protect the digital contents.

In one embodiment, a "common" separate verification library module (not shown) that continually verifies the modules 102 in a cyclical pattern may be employed. The period of the cyclical pattern may be implementation dependent, depending on the level of protection desired. The level of protection to be accorded may be made dependent on the media type and/or content format. The separate verification module maintains an integrity status table, against which the modules 102 may check to re-determine whether a particular downstream module of interest remains un-comprised prior to each transfer of a digital content to the downstream module. In alternate embodiments, the maintained status may be made available to modules 102 via other "query and answer" techniques. In one embodiment, this separate verification module may also perform the verification of a rendering module by checking the signature of the rendering module. Further, in one embodiment, this separate verification module may run in a background mode of computing environment 100.

If the rendering is successfully completed, the process may return to block 304, and waits for another rendering request. In alternate embodiment, as opposed to servicing one rendering request at a time, the present invention may also be practiced having multiple rendering performed concurrently, e.g. by having multiple execution threads of the applicable rendering modules executing at the same time.

In one embodiment, if any rendering fails to complete successfully, the process may enter an exception handling state, block 312. In one embodiment, if entry into the exception handling state is due to a verification failure, the event may cause an automatic re-installation of the "suspicious" module or modules 102. In one embodiment, the re-installation may be accomplished by re-downloading a known uncompromised version of the "suspicious" or compromised module from a "trusted" server, e.g. a distribution server of the rendering module.

Root Module

Figure 4A:
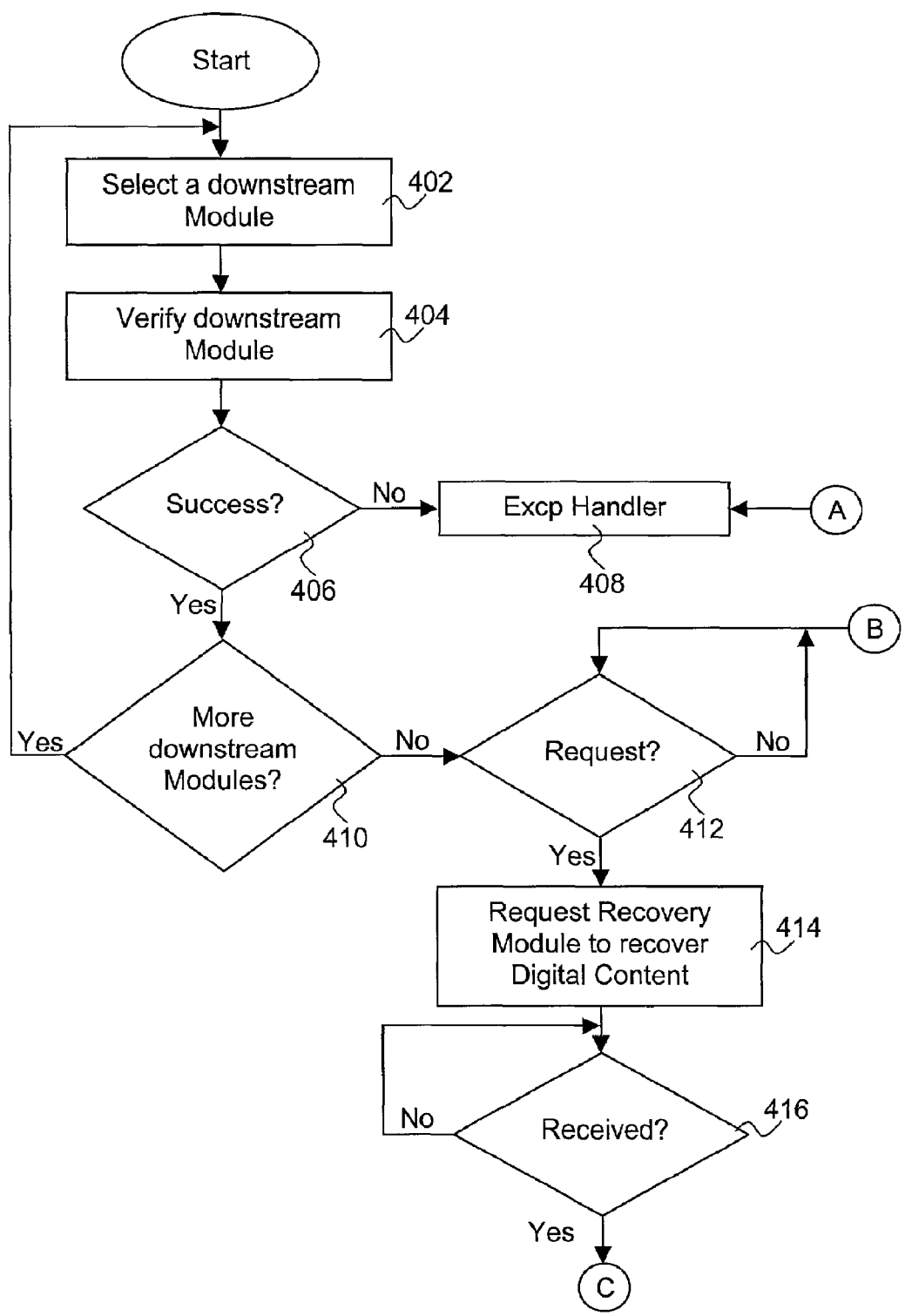
FIGS. 4a-4b illustrate the operational flow of the relevant aspects of a root module of a module hierarchy, in accordance with one embodiment.
Figure 4B:
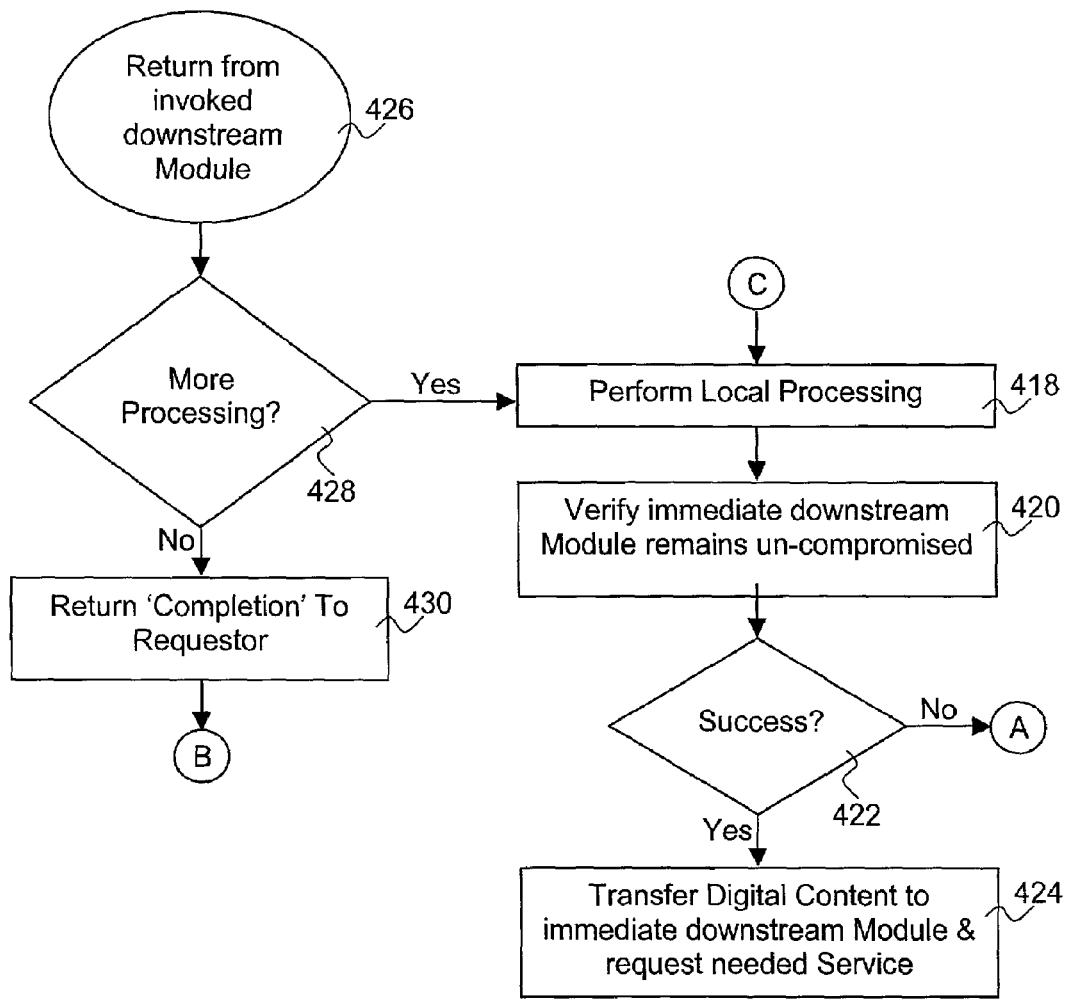

FIGS. 4a-4b illustrate the operational flow of the relevant aspect of the root module in further details, in accordance with one embodiment. As illustrated, at initialization, the root module may select an immediate downstream module, block 402, and verifies its integrity. In one embodiment, as described earlier, the verification may be accomplished by verifying the immediate downstream module's signature, block 404.

If the verification fails, no branch, block 406, the process may enter an exception processing state, block 408, which as described earlier, in one embodiment, may cause the re-installation of the failed module. If the verification is successful, yes branch, block 406, the root module may determine if there are more immediate downstream modules to verify, block 410. If so, the process may return to block 402, and continue from there as earlier described, until eventually all immediate downstream modules have been verified successfully.

At such time, the root module may wait for a rendering request, block 412. Upon receipt of such a request, assuming the digital content to be rendered is provided/maintained in a protected state, e.g. ciphered, the root module may request recovery module 104 to recover the digital contents to be rendered, block 414. Upon making the request, the root module may wait for the digital contents, block 416.

Upon provided with the recovered digital contents, the root module may perform processing that are its responsibility (also referred as "local" processing), such as memory allocation request, working data structure creation and initialization, and so forth, block 418. The exact nature of the local processing performed, may be application and media type as well as format dependent, and is not relevant to the practice of the invention. In the course of performing local processing, when a need arises to enlist the assistance of one or more of the downstream modules in the rendering of the digital contents, the root module may first re-verify the appropriate immediate downstream module, block 420. If the re-verification is unsuccessful, no branch, block 422, the process may enter the earlier described exception processing state. If the re-verification is successful, yes branch, block 422, root module 102 may transfer the digital contents to the re-verified immediate downstream module and request the needed auxiliary processing to be performed, block 424. In one embodiment, the re-verification may be performed, by checking the earlier described integrity status table.

For the embodiment, processing may be transferred back to the root module, block 426. At such time, root module 102 may determine if all required processing have been completed, block 428. If not, the process continues at block 418 as earlier described. If all required processing have been completed, for the embodiment, the root module may return at least a processing complete notification to the requestor process requested the rendering of the digital contents, block 430.

Non-Root Module

Figure 5A:
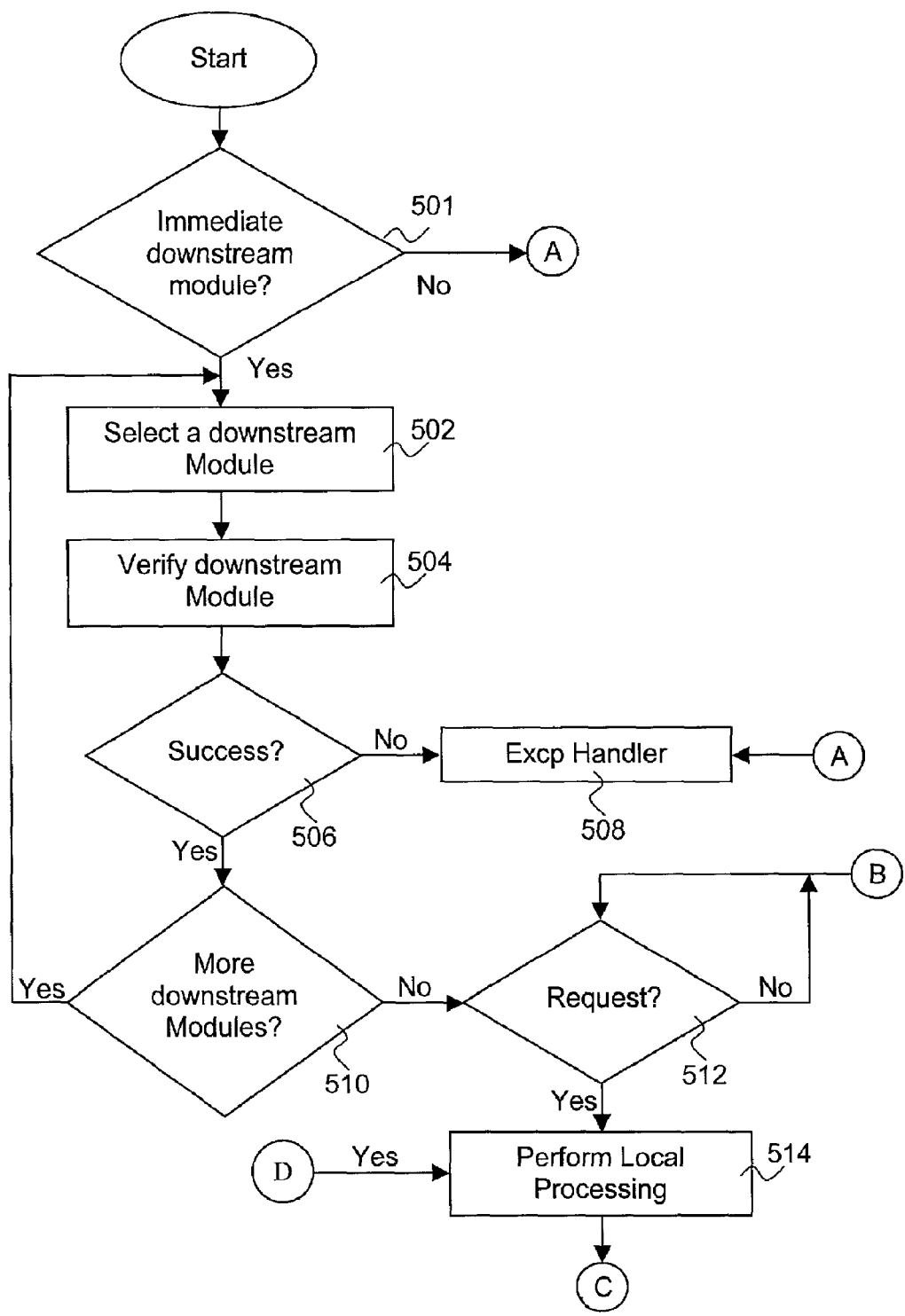
FIGS. 5a-5b illustrate the operational flow of the relevant aspects of a non-root module of a module hierarchy, in accordance with one embodiment.
Figure 5B:
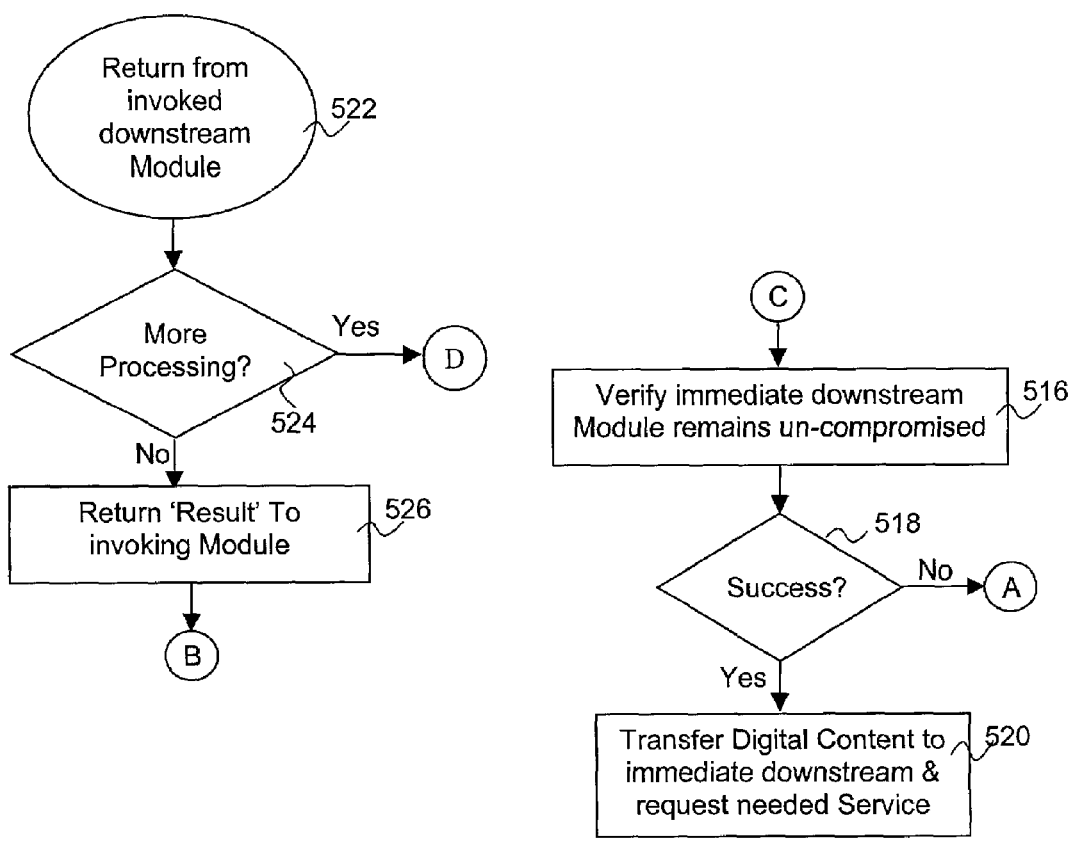

FIGS. 5a-5b illustrate the operational flow of the relevant aspect of a non-root module in further details, in accordance with one embodiment. As illustrated, at initialization, the non-root module may determine if it has any immediate downstream module, block 501. If the non-root module has no immediate downstream module, the process may proceed immediately to block 512, where the non-root module may wait for a request for its service. If the non-root module has at least an immediate downstream module, the non-root module may select one of the immediate downstream modules, block 502, and verify its integrity. In one embodiment, as described earlier, the verification may be accomplished by verifying the immediate downstream module's signature, block 504.

If the verification fails, no branch, block 506, the process may enter an exception processing state, block 508, which as described earlier, in one embodiment, may cause the re-installation of the failed module. If the verification is successful, yes branch, block 506, the non-root module may determine if there are more immediate downstream modules to verify, block 510. If so, the process may return to block 502, and continue from there as earlier described, until eventually all immediate downstream modules have been verified successfully.

At such time, the non-root module may wait for a request for its auxiliary service, block 512. Upon receipt of such a request, the non-root module may perform "local" processing (i.e. the portion of the requested service that it is responsible), block 514. Similar to the root module, the exact nature of the local processing performed, may be application and media type as well as format dependent, and is not relevant to the practice of the invention. In the course of performing local processing, when a need arises to enlist the assistance of one or more of the downstream modules in the rendering of the digital contents, the non-root module may re-verify the appropriate immediate downstream module, block 516. If the re-verification is unsuccessful, no branch, block 518, the process may enter the earlier described exception processing state. If the re-verification is successful, yes branch, block 518, the non-root module may transfer the digital contents to the re-verified immediate downstream module and request the needed auxiliary processing to be performed, block 520. In one embodiment, as the root module, the re-verification may be performed, by checking the earlier described integrity status table.

Similar to the root module, for the embodiment, processing may be transferred back to the non-root module, block 522. At such time, the non-root module may determine if all required processing have been completed, block 524. If not, the process may continue at block 516 as earlier described. If all required processing have been completed, for the embodiment, the non-root module may return at least a processing complete notification to the upstream module requested the auxiliary service, block 526.

Recovery Module

Figure 6:
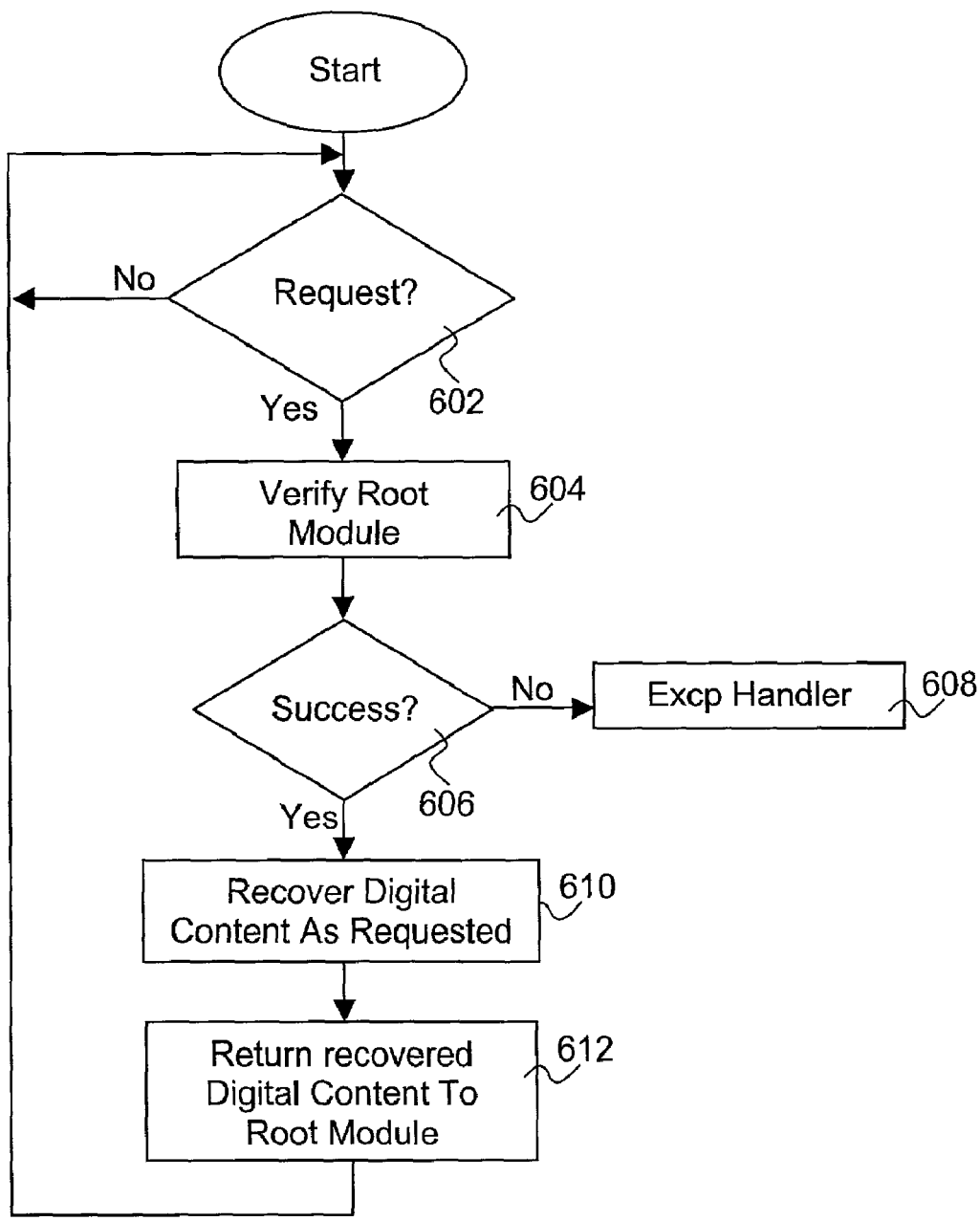
FIG. 6 illustrates the operational flow of the relevant aspects of the tamper resistant module of FIG. 1, in accordance with one embodiment.

FIG. 6 illustrates the operational flow of the relevant aspects of recovery module 104 in further details, in accordance with one embodiment. As illustrated, upon invocation, recovery module 104 may wait for a recovery request, block 602. Upon receipt of a request, recovery module 104 may verify the root module, block 604. In one embodiment, the verification may be accomplished by verifying the root module's signature. If the verification fails, no branch, block 606, the process may enter an exception processing state, block 608, which as described earlier, in one embodiment, may cause the re-installation of the failed root module. If the verification is successful, recovery module 104 may proceed to recover the protected digital content as requested, block 610. The exact nature of the recovery operation may be dependent on the protection employed, and potentially the media type as well as the content format. However, the exact nature of the processing performed to recover the digital contents is not relevant to the practice of the present invention. In one embodiment, as alluded earlier, tamper resistant measures may be applied to recovery module 104, such that the recovery operation may be performed in an obfuscated manner, thereby continuing the protection accorded to the digital contents.

Upon recovery of the protected digital content, the recovered digital content is returned to the requesting root module, block 612.

Extension Into Third Party Application Domains

Figure 7:
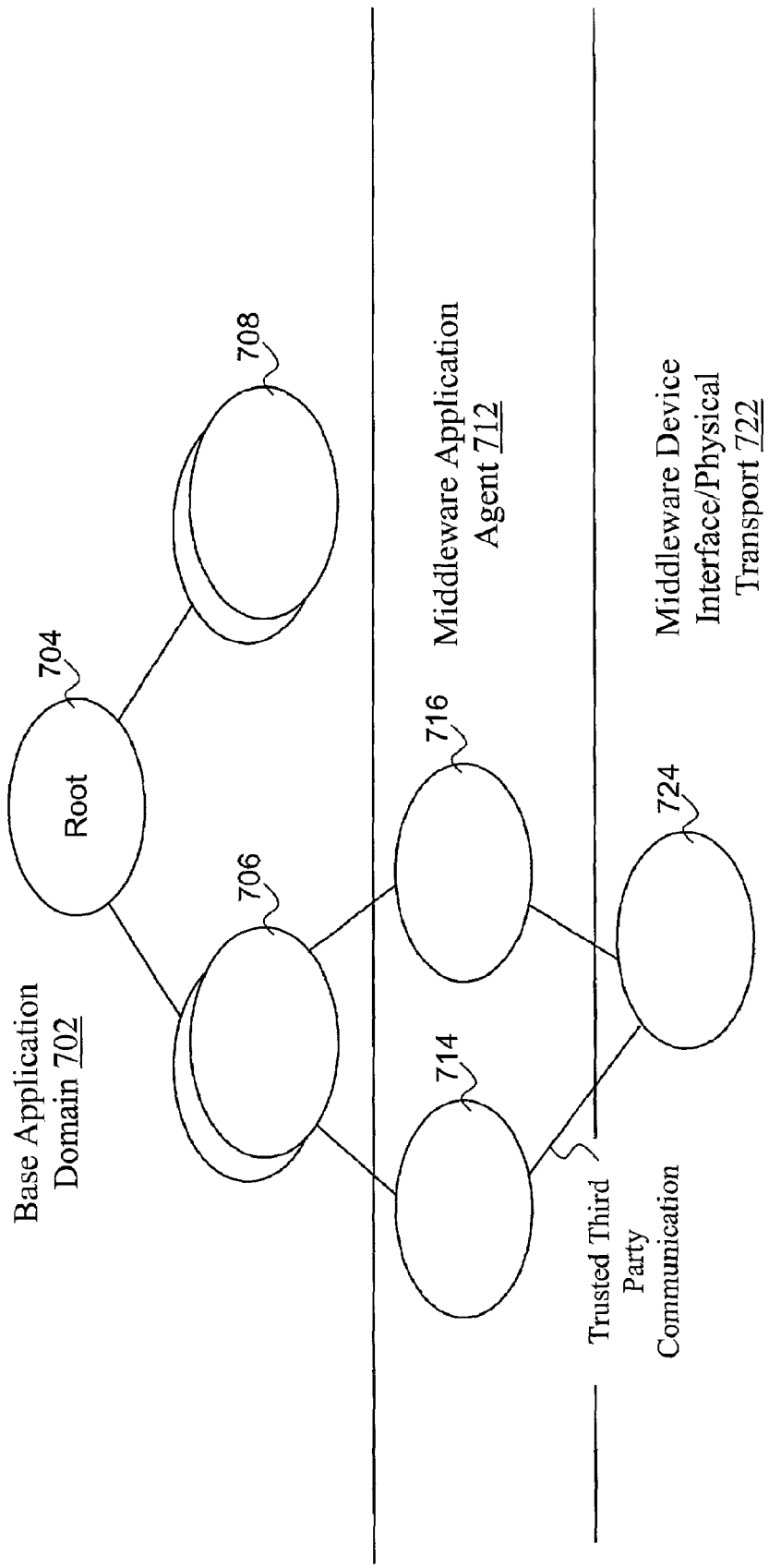
FIG. 7 illustrates another example hierarchy including modules of different application domains, in accordance with another aspect of the present invention.

The hierarchical authentication scheme of the present invention may also be extended to provide secure and authenticated communication channels across application domains to facilitate secure digital content rendering. FIG. 7 illustrates another example hierarchy including modules of multiple application domains, where the secure and trusted communication may be extended from the base application domain 702 to other third party application domains 712 and 714. As illustrated, modules 702-706 of the base application domain 702 may be equipped with the earlier described teachings of the present invention to authenticate the downstream modules including modules 714-716 of the middleware application domain. Similarly, modules 714-716 of the middleware application domain 712 may be equipped with the earlier described teachings of the present invention to authenticate the downstream module 724 of the middleware device level interface or physical transport 722.

Thus, the secure and authenticated communication of the base application domain 702 may be extended to include communications in third party application domains 712 and 722. An example of the base application domain 702 may be the domain of Real Player, a digital content rendering application available from Real Network of Seattle, Wash., and the middleware application may be the check-in and check-out logic of a portable digital content player, such as a MP3 player.

Example Computer System

Figure 8:
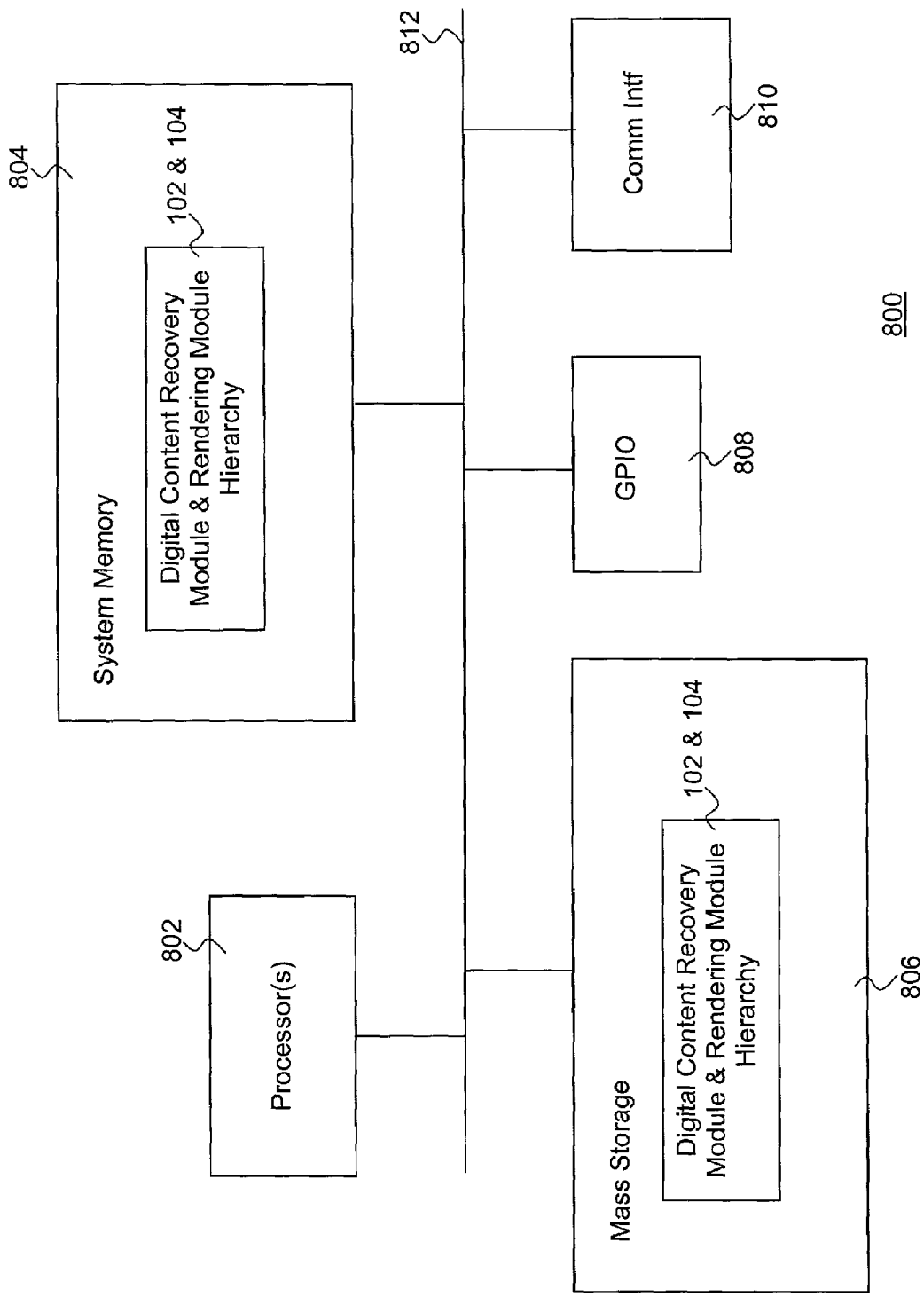
FIG. 8 illustrates an internal component view of a digital system suitable for use to practice the present invention, in accordance with one embodiment.

FIG. 8 illustrates an example computer system suitable for use to practice the present invention in accordance with one embodiment. As shown, computer system 800 includes one or more processors 802 and system memory 804. Additionally, computer system 800 may include mass storage devices 806 (such as diskette, hard drive, DVDROM, RAM, CDROM and so forth), general purpose input/output interface 808 (for interfacing input/output devices such as keyboard, cursor control and so forth) and communication interfaces 810 (such as network interface cards, modems and so forth). The elements are coupled with each other via system bus 812, which represents one or more buses. In the case of multiple buses, they are bridged by one or more bus bridges (not shown). Each of these elements performs its conventional functions known in the art. In particular, storage units, i.e. system memory 804 and mass storage 806, are employed to store a working copy and a permanent copy of the programming instructions implementing the earlier described digital content recovery module and the rendering modules incorporated with the teachings of the present invention. The permanent copy of the programming instructions may be loaded into mass storage 806 in the factory, or in the field, through a distribution medium, such as computer readable medium having recordable medium, including but not limited to magnetic, optical, and other medium of the like (not shown) or through communication interface 810 (from a distribution server (not shown)). The constitution of these elements 802-812 are known, and accordingly will not be further described.

Epilog

Thus, it can be seen from the above description, an improved method and apparatus for securely rendering protected digital content, in a less burdensome manner, and yet sufficiently robust, as well as scalable/extensible to support a significant number of media types and content formats has been described. While the present invention has been described in terms of the above illustrated embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A method comprising:
    with a tamper resistant digital content recovery module, recovering a first protected digital content of a first type in an obfuscated manner;
    with said tamper resistant digital content recovery module, verifying that a root module of a plurality of hierarchically organized plain text digital content rendering modules has not been compromised;

with said root module, verifying that at least one other module of said plurality of hierarchically organized plain text digital content rendering modules has not been compromised, wherein the at least one other module occupies an immediate downstream position in the hierarchy of modules from said root module; and rendering with said root module and at least said one other module said first digital content.

2. The method of claim 1, wherein verifying that a root module of plurality of hierarchically organized plain text digital content rendering modules has not been compromised comprises verifying a signature of said root module.

3. The method of claim 1, wherein verifying that at least one other module of said plurality of hierarchically organized plain text digital content rendering modules has not been compromised comprises verifying a signature of said one other module.

4. The method of claim 1, and further comprising: with said root module, verifying that a plurality of other modules occupying an immediate downstream position in the hierarchy of modules from said root module have not been compromised during an initialization.

5. An apparatus comprising:
a plurality of digital content rendering modules organized in a hierarchical manner;
a root module of said plurality of digital content rendering modules operable to verify that an immediate downstream module in the hierarchy of said plurality of digital content rendering modules has not been compromised;
a tamper resistant content recovery module operable to recover digital content of various types from a ciphered state in an obfuscated manner, and further operable to verify that said root module has not been compromised; and wherein said root module along with at least said immediate downstream module are operable to render a plain text version of the recovered digital content.

6. The apparatus of claim 5, and further comprising a non-leaf module occupying a nonleaf position in the hierarchy, wherein said non-leaf module is operable to verify that a module occupying a downstream position of the non-leaf module in said hierarchy has not been compromised, at least during initialization.

7. The apparatus of claim 5, and further comprising a non-leaf module occupying a nonleaf position in the hierarchy, wherein said non-leaf module is operable to verify that a module occupying a downstream position of the non-leaf module in said hierarchy has not been compromised before each transfer of the recovered digital content to said module occupying a downstream position.

8. The apparatus of claim 5, and further comprising and further comprising a non-leaf module occupying a non-leaf position in the hierarchy, wherein said non-leaf module is operable to verify that a module occupying a downstream position of the non-leaf module in said hierarchy has not been compromised by a verifying a signature of said module occupying a downstream position.

9. The apparatus of claim 5, wherein said digital content of various types comprises streaming media contents of a plurality of media types, and of a plurality of format types.

* * * * *